July 18, 1961     A. E. HERSHEY     2,992,531
TURBINE APPARATUS
Filed July 11, 1958     3 Sheets-Sheet 1
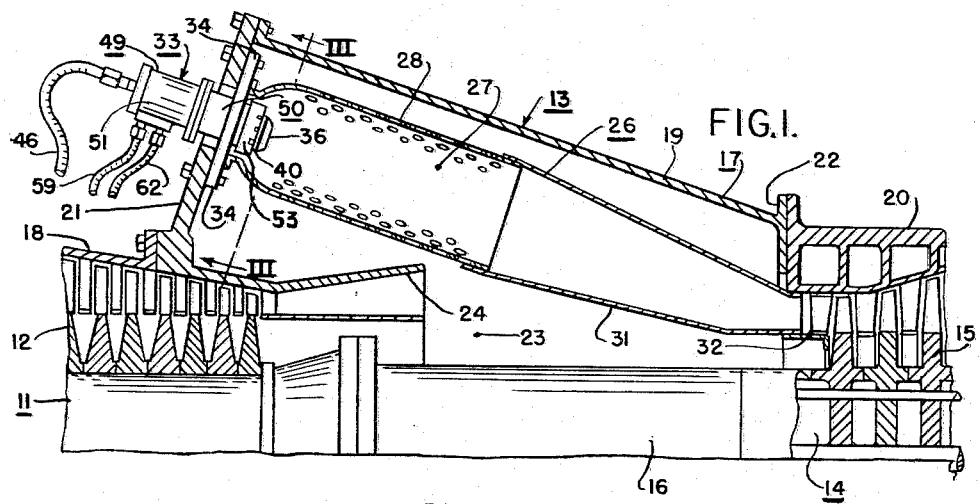
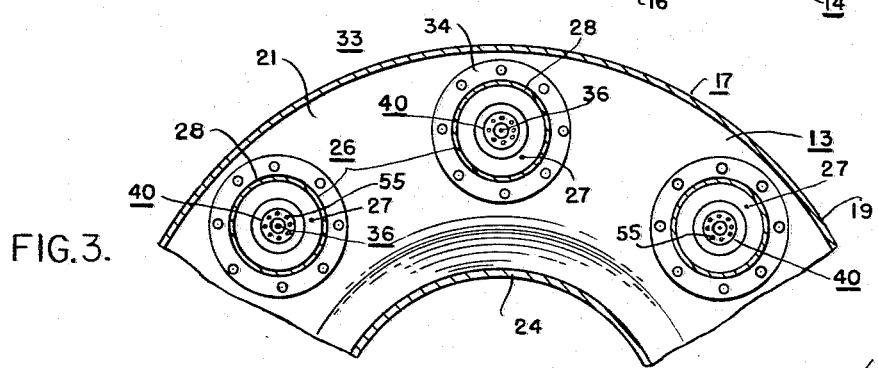
INVENTOR
ALBERT E. HERSHEY

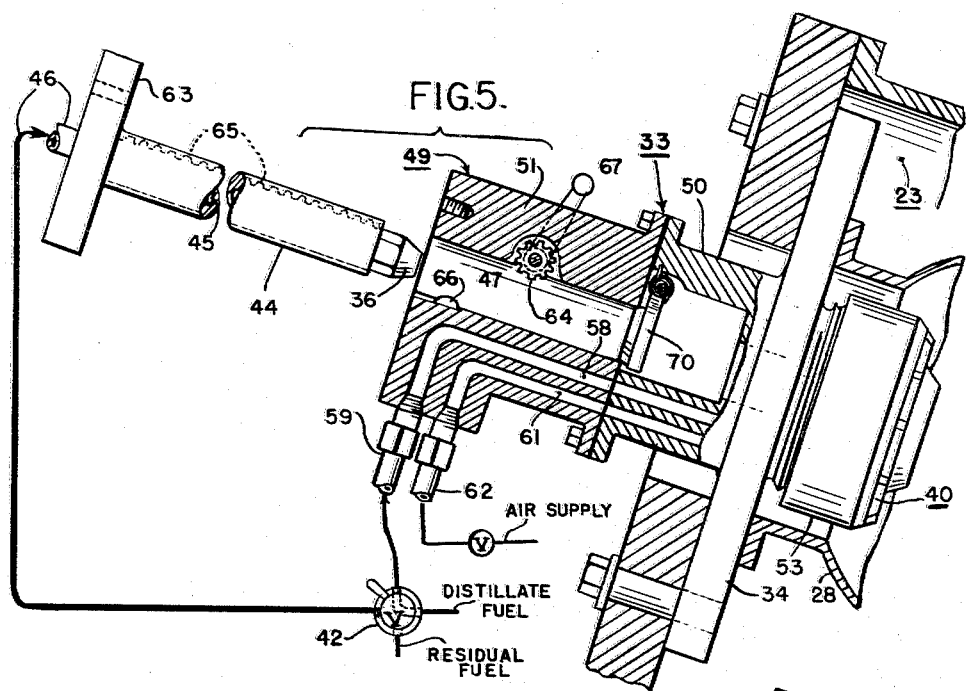
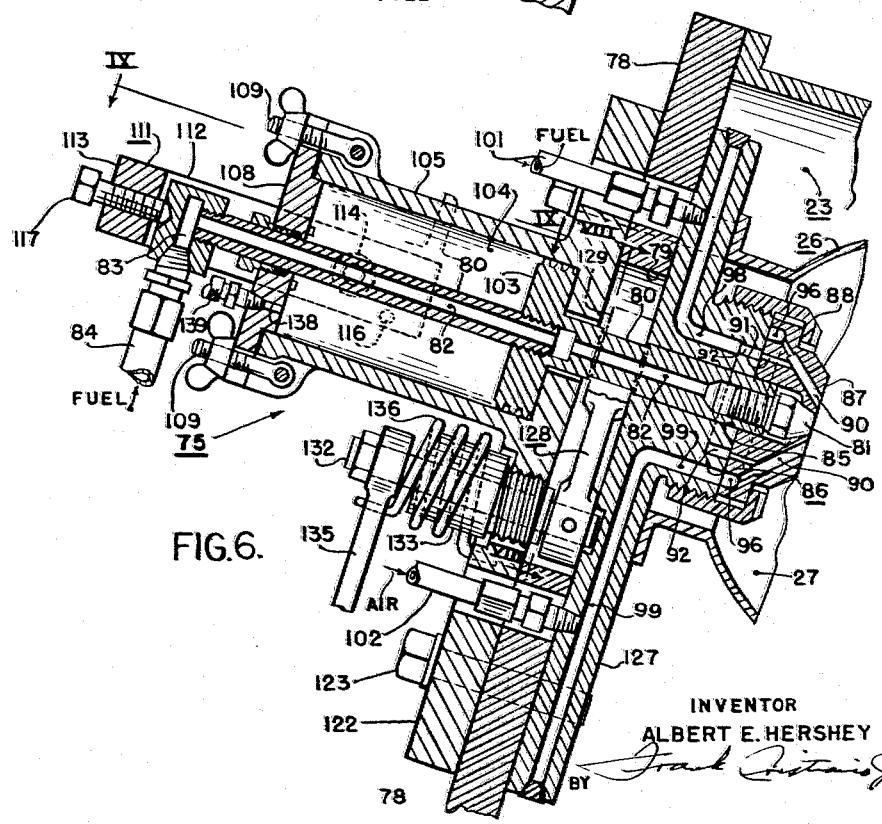

July 18, 1961  A. E. HERSHEY  2,992,531
TURBINE APPARATUS
Filed July 11, 1958  3 Sheets-Sheet 3
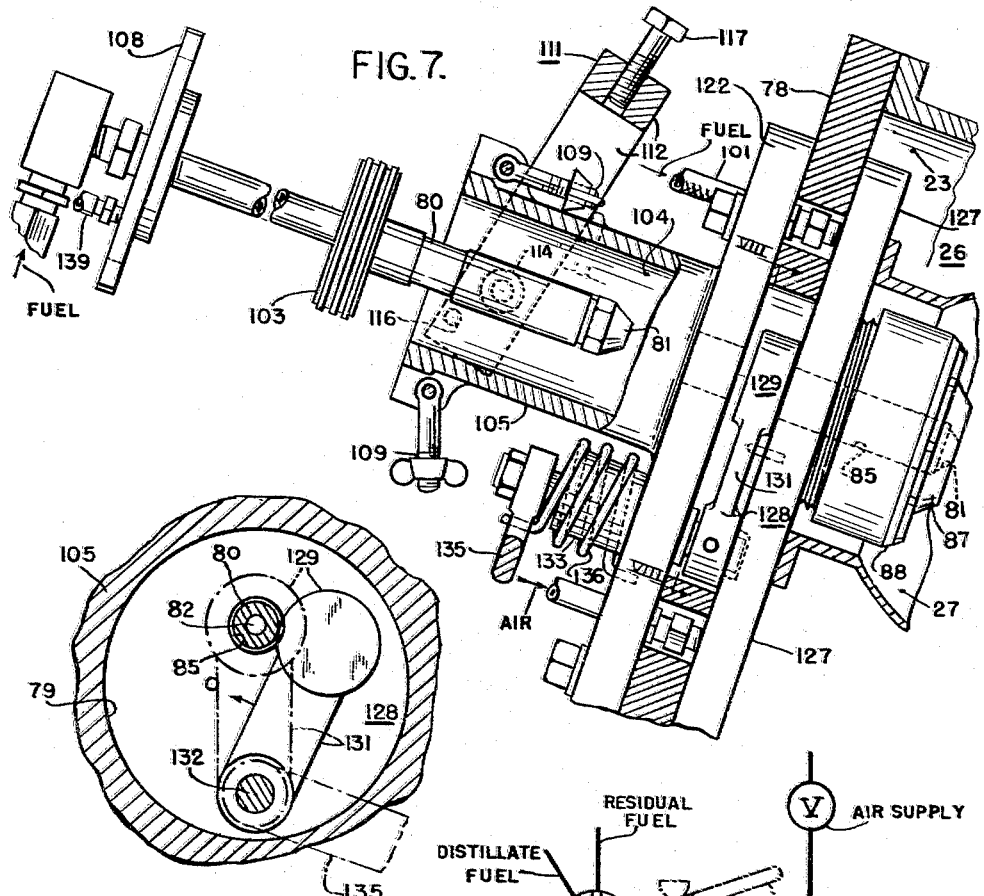
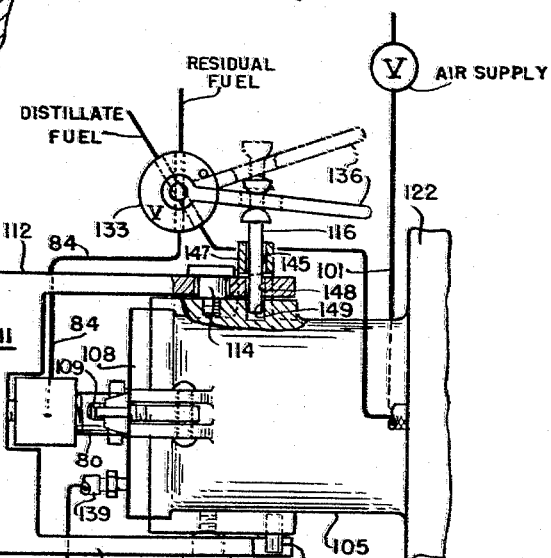
INVENTOR
ALBERT E. HERSHEY
BY *Frank Critinio Jr.*

United States Patent Office 2,992,531
Patented July 18, 1961

2,992,531
TURBINE APPARATUS
Albert E. Hershey, Swarthmore, Pa., assignor to Westinghouse Electric Corporation, East Pittsburgh, Pa., a corporation of Pennsylvania
Filed July 11, 1958, Ser. No. 747,983
3 Claims. (Cl. 60—39.74)

This invention relates to a structure or device for supplying fuel to a gas turbine power plant and particularly to fuel supplying structure having injection nozzles adapted to be utilized with fuel oils that tend to clog the nozzles.

In gas turbine power plants, it is desirable to burn residual fuel oils because they are more economical than many other types. Residual fuel oils, however, contain impurities that tend to clog the nozzles through which they are injected into the power plant and require that these nozzles be periodically cleaned or replaced. One object of the present invention is to provide fuel injecting structure in which the nozzle may be readily removed when necessary for cleaning or replacement.

It is desirable to replace or clean the clogged nozzles without having to shut down the power plant. Some turbines are constructed so that tubular combustors define a plurality of individual fuel combustion chambers, each provided with fuel supplying nozzle structure, which supply combustion gases to an annular inlet structure communicating with the turbine blades. It is advantageous to maintain continuous combustion in each of the combustion chambers, otherwise the turbine blades will be exposed to an intermittent gas stream, resulting in the imposition of undesirable shocks upon the turbine blades. Thus, another object of this invention is to provide a structure having a fuel injecting nozzle which will supply residual fuel oil to the combustion chamber and which will maintain combustion therein when the nozzle is being replaced or cleaned.

Within the combustion chamber, the combustion gases are at a high pressure. Therefore, it is a further object of the present invention to prevent the combustion gases from escaping when the fuel injecting nozzle is being cleaned or replaced.

One gas turbine power plant incorporating the present invention is provided with a fuel supplying structure including a main fuel nozzle and an auxiliary fuel nozzle. The main fuel nozzle is employed to provide residual fuel oil and is readily removable. The auxiliary fuel nozzle is not readily removable and is employed to provide that tend to clog such nozzles. A control valve is provided for controlling the flow of fuel through these nozzles. The main fuel nozzle is removed, when desired, through a passage in a wall partially defining the combustion chamber with which it is associated. A check valve is provided to close this passage upon removal of the main fuel nozzle to prevent the escape of combustion gases.

A mechanism is provided for placing or removing the main fuel nozzle in or out of, respectively, fluid communication with the combustion chamber. This mechanism comprises a shaft secured to the main fuel nozzle and a sleeve having a passage for slidable movement of the shaft therein. The sleeve is fixedly secured relative to the combustion chamber and a device is provided for moving the shaft and the main fuel nozzle through the passage.

The control valve is actuated to terminate the flow of fuel to the main fuel nozzle prior to the removal of the latter and, simultaneously therewith, to initiate the flow of fuel to the auxiliary fuel nozzle, thereby to maintain combustion within the combustion chamber during the removal and absence of the main fuel nozzle.

As the main fuel nozzle and shaft are moved from the passage, the check valve closes the passage, preventing fluid communication between the combustion chamber and the atmosphere. The main fuel nozzle may then be cleaned or a new one substituted therefor, as required, and replaced by inserting the shaft and main fuel nozzle in the passage, opening the check valve, and placing the main fuel nozzle in proper fluid communication with the combustion chamber. The control valve is subsequently actuated to terminate the flow of fuel to the auxiliary fuel nozzle and initiate the flow of fuel to the main fuel nozzle.

The foregoing and other objects are effected by the invention as will be apparent from the following description and claims taken in connection with the accompanying drawings, forming a part of this application, in which:

FIG. 1 is a fragmentary axial sectional view of a gas turbine power plant having fuel combustion apparatus and fuel supplying structure embodying the present invention;

FIG. 2 is an enlarged axial sectional view of the fuel supplying structure illustrated in FIG. 1;

FIG. 3 is a cross sectional view taken along the line III—III of FIG. 1, showing a portion of the plenum chamber and several combustion chambers;

FIG. 4 is a cross sectional view taken along the line IV—IV of FIG. 2;

FIG. 5 is a view, partly in section, of the apparatus illustrated in FIG. 2, but showing the fuel supplying structure partly disassembled;

FIG. 6 is a sectional view similar to FIG. 2, but illustrating a second embodiment of the present invention;

FIG. 7 is a view of the second embodiment, partly in section, in which a portion of the fuel supplying structure is disassembled;

FIG. 8 is a cross sectional view taken along the line VIII—VIII of FIG. 7; and

FIG. 9 is a plan view of the apparatus illustrated in FIGS. 6, 7 and 8.

Referring to the drawings in detail, in FIG. 1 there is shown a gas turbine power plant comprising an axial-flow air compressor 11 having a bladed rotor 12, and combustion apparatus 13 for supplying motive gases to an axial-flow turbine 14 having a bladed rotor 15. The compressor rotor 12 is connected to the turbine rotor 15 by a drive shaft 16 and driven thereby to provide pressurized air to the combustion apparatus.

The foregoing elements are encased within a tubular housing aggregate 17 comprising a tubular compressor housing portion 18, a frusto-conical combustion apparatus housing portion 19 and a tubular turbine housing portion 20. Front and rear wall closure members 21 and 22 of annular shape are also provided for the housing portion 19.

The compressor outlet structure may be provided with an annular diffusion structure 24, so that the compressed air from the compressor 11 is diffused before admission to the plenum chamber 23 with reduction in velocity and attendant increase in pressure. The entire plenum chamber 23 is thus filled with highly pressurized air moving therethrough at a relatively low velocity.

Within the plenum chamber 23 there is provided an annular row of axially inclined tubular combustors 26 of the well-known canister type, defining fuel combustion chambers 27. As shown in FIG. 1, the combustors 26 comprise front generally cylindrical walls 28 and rear tubular exhaust transition members 31 in fluid communication with an annular inlet path defined by rings 32 of the turbine 14.

A plurality of fuel supplying structures or devices 33, formed in accordance with the invention are secured to the front wall 21, as illustrated in FIGS. 1, 2 and 5, Each of the combustion chambers 27 is provided with one of the fuel supplying devices 33. If desired, each of the fuel supplying devices 33 may be secured by flange portions 34 between the annular wall 21 and portions of the walls 28 of the associated combustor.

Each fuel supplying device 33 includes a main fuel injecting nozzle 36 in fluid communication with the associated combustion chamber 27, as illustrated in FIG. 2. The main fuel nozzle 36 is provided with fuel spraying passages (not illustrated) for injecting a first or main fuel, which may be a residual fuel, into the combustion chamber 27.

Encompassing the main fuel nozzle 36, and associated therewith, is an auxiliary fuel nozzle 40 provided with fuel spraying passages, described in detail subsequently, for injecting a second or auxiliary fuel into the combustion chamber 27 during periods when the main fuel nozzle is removed for repair or cleaning. The auxiliary fuel nozzle 40 is not readily removable. Hence, the auxiliary fuel supplied thereto is preferably clean and free of impurities to obviate clogging. This second fuel, which may be a diesel fuel, is sprayed into the combustion chamber by the auxiliary fuel nozzle, when the associated main fuel nozzle is removed, to provide a flow pattern of combustion gases to the turbine substantially similar to that attained when the fuel is provided by the main fuel nozzle. In this manner, even though each of the combustors 26 is tubular, the flow of gases to the turbine is maintained along the entire annular path of admission, even when one or more of the main fuel nozzles is being replaced or cleaned.

The flow of fuels to the main fuel nozzle 36 and the auxiliary fuel nozzle 40 is selectively controlled by a control valve 42. When it is desired to remove the main fuel nozzle 36 for servicing, the control valve 42 is actuated to terminate the flow of fuel to the main fuel nozzle 36 and initiate the flow of fuel to the auxiliary fuel nozzle 40, thereby to permit uninterrupted combustion. After the main fuel nozzle 36 is replaced, the control valve 42 is actuated to terminate the flow of fuel to the auxiliary fuel nozzle 40 and re-initiate the flow of fuel to the main fuel nozzle 36.

The main fuel nozzle 36 is secured to one end of an elongated shaft 44 having a central elongated passage 45 in communication with the main fuel nozzle. A conduit 46 is connected at one end to the left-hand portion of the shaft 44, in communication with the passage 45, for supplying the main fuel nozzle with the first fuel, and at the other end portion to the fuel flow control valve 42. The shaft 44 is slidably received in a central passage 47 formed in a sleeve structure 49, the latter being divided into a right-hand sleeve portion 50 and a left-hand sleeve portion 51 connected to each other by suitable bolts. The right-hand sleeve portion 50 extends through an opening 52 in the front wall 21 and is formed integral with the flange 34, forming therewith an upstream closure wall for the combustion chamber 27.

The auxiliary fuel nozzle 40 encompasses the main fuel nozzle 36 and is secured to the sleeve portion 50 by a threaded collar 53. The auxiliary fuel nozzle 40 is formed with a conical seat 54 in which a forward tapered portion of the nozzle 36 is disposed, for positioning the main fuel nozzle 36 in its rightmost position, as viewed in FIG. 2. The auxiliary fuel nozzle 40 is provided with converging passages 55, circumferentially disposed around the main fuel nozzle 36, for the flow therethrough of the second fuel.

The converging passages 55 are in communication, through channels 56, with a manifold or annulus 57. The annulus 57 is supplied with a second fuel through a longitudinally extending passage 58 formed in the sleeve 49 and a conduit 59, by the fuel flow control valve 42. Also, the passages 55 are in communication with a manifold or annulus 60 supplied with air for atomizing the fuels through a longitudinally extending passage 61 disposed in communication with an air supply conduit 62.

The shaft 44 is provided with a radially extending flange 63 abutting the left-hand portion of the sleeve portion 51 and secured thereto by bolts 63a to maintain the main fuel nozzle 36 in its rightmost position abutting the conical seat 54.

A gear 64, housed within the sleeve portion 51, and a rack 65, formed on the shaft 44, are provided to facilitate insertion of the shaft 44 within the passage 47 and for controlling its removal therefrom. If desired, the shaft may be properly angularly positioned within the passage 47 by a key 66 disposed in the sleeve portion and slidably received in a mating groove formed on the shaft. The gear 64 is connected through a suitable rod to a crank arm 67.

A check valve 70 is disposed within the sleeve portion 49 for restricting or closing the passage 47, upon movement of the shaft 44 to the left thereof, as best illustrated in FIG. 5. The check valve 70 prevents the gases within the combustion chamber 27 from escaping to the atmosphere when shaft 44 is withdrawn and may be biased to the closed position by a suitable spring, as best illustrated in FIG. 4.

The control valve 42 is operable from a first position, shown in FIG. 2, in which the conduit 46 is placed in fluid communication with a suitable source of first fuel (not shown) while communication between the conduit 59 and a suitable source of second fuel (not shown) is completely restricted, to a second position, shown in FIG. 5, in which the conduit 59 is placed in communication with the source of second fuel while communication between the conduit 46 and the source of first fuel is completely restricted.

The normal condition of operation is with fuel flow through the main fuel nozzle 36, the control valve 42 being in the first position. During such operation air for atomizing the fuel is provided by conduit 62 to the converging passages 55. When it is desired to replace or clean the main fuel nozzle 36, while maintaining combustion within the associated combustion chamber, the control valve 42 is moved to its second position. The flow of fuel to the main fuel nozzle is thus terminated and the required flow of fuel to the auxiliary fuel nozzle is initiated. Such fuel flow is also atomized by air flow through the converging passages 55. Thereafter, the bolts 63a are removed but prior to removal of the last one, it is desirable for the operator to place a hand upon the crank arm 67 to restrain the movement of the shaft 44 to the left, which would otherwise be rapid due to the thrust induced by the pressure of the combustion gases within the combustion chamber 27 upon the main fuel nozzle 36. Another reason for restraining movement of the shaft 44 is to hold the same within the passage 47, after the main fuel nozzle has moved to the left of the check valve 70, until the check valve 70 is properly seated, thus insuring that the escape of gases, through the passage 47, from the combustion chamber 27 to the atmosphere will be prevented. After the check valve 70 is properly seated, the crank arm 67 is rotated clockwise until the shaft 44 is removed from the passage 47, as viewed in FIG. 5.

Thereafter, the main fuel nozzle 36 may be replaced or cleaned, and the shaft 44 with the new or cleaned nozzle in position may then be inserted within the passage 47. During insertion, the rack 65 is positioned with respect to the gear 64 by placing the key 66 in the mating groove formed on the shaft 44. The gear 64 is then rotated in the counterclockwise direction by the crank arm 67 until the main fuel nozzle 36 urges the check valve 70 open. Movement of the main fuel nozzle 36 is continued to the right, the lower portion of the check valve riding on the shaft 44, as illustrated in FIG. 4, until the main fuel nozzle 36 is seated in its rightmost position against the conical seat 54. Thereafter, the flange 63 is secured to the left-hand sleeve portion 51 by replacement of the bolts. The control valve 42 is then returned to the first position, thereby terminating the flow of fuel through the auxiliary fuel nozzle 40 and re-initiating the flow of fuel through the main fuel nozzle 36.

The second embodiment of a fuel supplying device 75, as illustrated in FIGS. 6 through 9, is constructed generally similar to the first embodiment. A front wall 78, similar to the front wall 21 of the first embodiment, defines in part a plenum chamber 23 in which are disposed combustors 26 defining combustion chambers 27, identical to those of the first embodiment and, hence, the same reference numerals are utilized. The front wall 78 is provided with an opening 79 through which a shaft 80 extends, the shaft 80 having secured thereto, at the right-hand end portion, a main fuel nozzle 81. The main fuel nozzle 81 supplies the first fuel to the combustion chamber 27. The main fuel nozzle 81 is also in fluid communication with a central passage 82 formed in the shaft 80, the passage 82 being in fluid communication with a passage 83 and a conduit 84 for supplying the first fuel to the main fuel nozzle 81. Similarly to the first embodiment, the shaft 80 is slidably received within a passage 85 formed within a sleeve 86. An auxiliary fuel nozzle 87, for supplying the second fuel to the combustion chamber, encompasses the main fuel nozzle 81 and is secured to the sleeve 86 by a threaded collar 88.

The auxiliary fuel nozzle 87 is provided with converging passages 90, channels 91 and an annulus or manifold 92, in a manner similar to that of the first embodiment, for delivering the second fuel to the auxiliary fuel nozzle 87. Also, the converging passages 90 communicate with a manifold or annulus 96, in a manner similar to that of the first embodiment, for delivering atomizing air to the fuel nozzles. The annuli 92 and 96 communicate with passages 98 and 99, respectively, which in turn communicate with fuel and air supply conduits 101 and 102, respectively.

Similar to the first embodiment, the auxiliary fuel nozzle is provided with a conical seat for limiting movement of the main fuel nozzle to the right, as viewed in FIG. 6.

Disposed along the middle portion of the shaft 80 is a piston or abutment 103 for assisting in the movement of the shaft 80. The piston 103 and a portion of the shaft 80 are disposed within a chamber 104 defined by a cylinder 105, having a right-hand end wall through which a portion of the shaft 80 extends. The cylinder 105 is provided with a removable head 108, secured to the cylinder 105 by bolts and nuts 109.

A yoke 111 having a pair of parallel arms 112 connected by a bar 113 is pivotally connected by pins 114 to the cylinder 105. The yoke 111 is locked against rotation by a pin 116 (see FIG. 9) and is provided with a bolt 117 threadedly received in the bar 113 and seated in one end of the shaft 80, for restraining movement of the latter to the left, as viewed in FIGS. 6 and 9.

The cylinder 105 is provided with a flange portion 122 secured by suitable bolts 123 to the left-hand surface of the front wall 78 and the sleeve 86 is provided with a suitable flange 127 similarly attached to the right-hand surface of the front wall 78. The opening 79 is large enough to house a guillotine valve 128 that restrains movement of the shaft 80, as best illustrated in FIGS. 6 and 8, by engaging an annular groove formed in the shaft 80. The guillotine valve 128 includes a circular valve member 129 secured by an arm 131 to a shaft member 132. The shaft member 132 is rotatably supported in a suitable bearing 133 (the bearing 133 being secured to a portion of the flange 122) and controllable by a handle 135. The guillotine valve 128 is biased toward the closed position by a torsion spring 136.

The removable head 108 is provided with an opening 138 to which is connected a conduit 139 for the flow therethrough of air that controls movement of the piston 103. As illustrated in FIG. 9, the conduit 139 is in fluid communication with a valve 141 that is, in turn, connected to a suitable supply of pressurized air (not shown) and to another valve 143 having an orifice for slowly venting the chamber 104 to the atmosphere.

The fuel conduits 84 and 101 are connected to a control valve 133, having a handle 136. The control valve 133 is rotatable from a first position (shown in solid lines) to a second position (shown in dot-dash lines). The control valve is somewhat similar to the corresponding valve of the first embodiment and permits fuel flow to the main fuel nozzle in the first position and prevents fuel flow to the main fuel nozzle in the second position, as fully outlined with respect to the first embodiment. In this instance, however, the handle 136 is pivotally connected to one end of the pin 116. The pin 116 is slidable in an opening 145 formed in a member 147 projecting from the wall of the cylinder 105. One of the arms of the yoke 111, the top one as viewed in FIG. 9, is provided with an opening 148, registering with the opening 145, through which the pin 116 extends and projects into a further aligned opening 149 formed in the cylinder 105. The pin 116 is withdrawn from the openings 149 and 148 when the handle 136 is moved from the first position to the second position. Therefore, the pin 116 prevents the yoke 111 from being disengaged from the shaft 80 while the control valve 133 is in the first position, the position which supplies fuel to the main fuel nozzle. For facilitating the mutual alignment of the openings 145, 148 and 149, a stop pin 150, abutting the bottom arm, may be provided for limiting rotation of the yoke 111.

When the power plant is in normal operation and it is desired to replace or clean the main fuel nozzle 81, the handle 136 of the control valve 133 is moved from the first position to the second position, thereby terminating the flow of fuel to the main fuel nozzle and initiating the supply of fuel to the auxiliary fuel nozzle. The bolt 117 abutting the shaft 80 is then loosened and the yoke 111 is rotated clockwise, to the position illustrated in FIG. 7. Thereafter, the handle 135 of the guillotine valve 128 is rotated clockwise, as viewed in FIG. 8, to disengage the valve member 129 from the shaft 80. Subsequently, the valve 141, for supplying air to the chamber 104, is closed, if it has not been previously closed, and the valve 143 is opened to vent the chamber 104 to the atmosphere. The restriction in the valve 143 insures that the venting will be done gradually, so that the piston secured to the shaft 80 will move back or to the left, as viewed in FIGS. 6 and 7, slowly.

After the shaft 80 has moved sufficiently to the left to pass the guillotine valve 128, the guillotine valve handle is released, thereby permitting the valve to rotate in a counterclockwise direction under the bias of the torsion spring, until the valve member 129 closes the passage 85, a stop member being provided for purposes of alignment between the valve member 129 and the passage 85. After the guillotine valve 128 is properly centered, the bolts 109 which secure the removable head 108 are loosened and removed from engagement with the head. The shaft 80 may now be manually pulled out of the chamber 104, and, thereafter, the main fuel nozzle replaced or cleaned, while the auxiliary fuel nozzle supplies fuel to the combustion chamber 27.

After the main fuel nozzle has been replaced or cleaned, the shaft 80 is placed into the chamber 104, the removable head 108 positioned properly and secured by the bolts 109, and the vent valve 143 is closed. The guillotine valve 128 is then opened by rotating its handle 135 clockwise, as viewed in FIG. 8, against the bias of the torsion spring, and pressurized air is simultaneously admitted to the chamber 104 by opening the air supply valve 141. This air forces the piston to the right, seating the main fuel nozzle in the conical seal of the auxiliary fuel nozzle. When the shaft 80 is properly seated, the guillotine valve 128 is allowed to engage the groove formed in the shaft 80 and thereafter the air supply valve 141 may be closed. The yoke member may now be rotated in a counterclockwise direction and the bolt 117 put into position for additionally restraining movement, to the left, of the shaft 80. The fuel control valve may now be rotated from the second to the first position, whereby fuel flow through the auxiliary nozzle is terminated and fuel flow through the main fuel nozzle is re-initiated.

From the foregoing it is seen that the present invention provides a fuel supplying device in which the main fuel nozzle which supplies the first fuel may be readily removed for cleaning or replacement, when desired, without requiring the power plant to be shut down. Furthermore, by providing an auxiliary fuel nozzle for supplying the second fuel during the interval in which the flow of first fuel is terminated, while the main fuel nozzle is being repalced or cleaned, the flow pattern of gases to the turbine is not changed substantially from that existing when fuel is being supplied through the main fuel nozzle, since the flow of fuel through the auxiliary fuel nozzles enables combustion to be continued without interruption in the combustors.

Thus, the utilization of relatively inexpensive oils, such as residual oil, as the main or first fuel is rendered more practical, since heretofore one of the disadvantages of using such a fuel has been the necessity for periodically shutting down the power plant to permit replacing or cleaning the nozzles clogged by the residual oil.

It will be noted that the auxiliary fuel nozzles need little if any servicing, since they are employed with clean oil such as diesel fuel. The diesel fuel is more expensive than the reidual oil. However, the auxiliary nozzles are employed for brief periods only and hence add little to the cost of operation of the power plant.

While the invention has been shown in several forms, it will be obvious to those skilled in the art that it is not so limited, but is susceptible of various other changes and modifications without departing from the spirit thereof.

What is claimed is:

1. In pressurized combustion apparatus, the combination comprising wall structure defining an air flow passageway, a combustion chamber disposed in said passageway, a fuel supplying device adjacent said wall structure for admitting fuel to said combustion chamber, said fuel supplying device comprising a main fuel nozzle for supplying a first fuel, an auxiliary fuel nozzle adjacent said main fuel nozzle, means for supplying a first fuel to said main fuel nozzle, means for supplying a second fuel to said auxiliary fuel nozzle, said nozzles being in fluid communication with said combustion chamber, said auxiliary fuel nozzle being fixedly positioned relative to said combustion chamber, a supporting shaft to which said main fuel nozzle is secured at one end portion thereof, said wall structure having a passage and said shaft extending therethrough, means for moving said main fuel nozzle into and out of fluid communication with said combustion chamber through said passage including a piston secured to said shaft for controlling the movement of the latter through said passage, and a member movable from one position in which movement of said shaft is restrained to another position in which movement of said shaft is permitted, first valve means for closing said passage upon removal of said shaft from said passage and for opening said passage upon replacement of shaft in said passage, and second valve means for selectively admitting said first fuel to said main fuel nozzle and said second fuel to said auxiliary fuel nozzle.

2. In pressurized combustion apparatus, the combination comprising wall structure defining a pressurized air passageway, means defining an annular array of tubular combustion chambers disposed in said passageway and an annular array of fuel supplying devices attached to said wall structure, each one of said combustion chambers being cooperatively associated with one of said fuel supplying devices, each fuel supplying device comprising a translatable main fuel nozzle for supplying a first fuel to the associated combustion chamber, a fixed auxiliary fuel nozzle for supplying a second fuel to said combustion chamber, the nozzles being in fluid communication with said combustion chamber, selectively operable valve means movable to a first position for supplying said first fuel to said main fuel nozzle and restricting flow of said second fuel to said auxiliary fuel nozzle, said valve means being further movable to a second position for restricting fuel flow to said main fuel nozzle and supplying fuel to said auxiliary fuel nozzle, said nozzles being coaxially disposed and arranged to provide substantially similar flow patterns, a shaft having said main fuel nozzle secured thereto, means defining a passage for said shaft, said main fuel nozzle being axially movable in said passage and retractable therefrom, and means for retracting said main fuel nozzle from and for inserting said main fuel nozzle into said passage including a piston secured to said shaft for controlling the movement of the latter in said passage, means providing a fluid pressure against said piston to actuate the same, a member movable from one position in which movement of said shaft is restrained to another position in which movement of said shaft is permitted, and a check valve for closing said passage upon retraction of said main fuel nozzle from said passage and for opening said passage upon insertion of said main fuel nozzle into said passage.

3. In pressurized combustion apparatus, the combination comprising a wall structure defining an air flow passageway, a combustion chamber disposed in said passageway, a fuel supplying device adjacent said wall structure for admitting fuel to said combustion chamber, said fuel supplying device comprising a main fuel nozzle, an auxiliary fuel nozzle adjacent said main fuel nozzle, means for supplying a first fuel to said main fuel nozzle, means for supplying a second fuel to said auxiliary fuel nozzle, means including an annular array of passages for providing atomizing air to said main and auxiliary fuel nozzles, said nozzles being in fluid communication with said combustion chamber, said auxiliary fuel nozzle being fixedly positioned relative to said combustion chamber and having said atomizing means disposed therein, a supporting shaft to which said main fuel nozzle is secured at one end portion thereof, said wall structure having a passage therethrough, means for moving said main fuel nozzle into and out of fluid communication with said combustion chamber through said passage including a piston secured to said shaft for controlling the movement of the latter through said passage, and a yoke member movable from one position in which movement of said shaft is restrained to another position in which movement of said shaft is permitted, first valve means for closing said passage upon removal of said shaft from said passage and for opening said passage upon replacement of said shaft in said passage, means for biasing said first valve to the closed position, and second valve means for selectively admitting said first fuel to said main fuel nozzle and said second fuel to said auxiliary fuel nozzle.

References Cited in the file of this patent

UNITED STATES PATENTS

| 2,049,508 | McDonald | Aug. 4, 1936 |
|---|---|---|
| 2,124,175 | Zink | July 19, 1938 |
| 2,368,178 | Turpin | Jan. 30, 1945 |
| 2,778,686 | Daniel | Jan. 22, 1957 |
| 2,804,917 | Smith | Sept. 3, 1957 |

FOREIGN PATENTS

| 157,457 | Australia | July 6, 1954 |
|---|---|---|
| 597,331 | Great Britain | July 31, 1946 |

UNITED STATES PATENT OFFICE
CERTIFICATE OF CORRECTION

Patent No. 2,992,531                                            July 18, 1961

Albert E. Hershey

It is hereby certified that error appears in the above numbered patent requiring correction and that the said Letters Patent should read as corrected below.

Column 1, line 49, after "to provide" insert -- a fuel that is substantially free and clear of impurities --.

Signed and sealed this 5th day of December 1961.

(SEAL)
Attest:

ERNEST W. SWIDER                                    DAVID L. LADD
Attesting Officer                                         Commissioner of Patents
                                                                             USCOMM-DC